United States Patent

Shaw et al.

[11] Patent Number: 5,077,700
[45] Date of Patent: Dec. 31, 1991

[54] DOPPLER VELOCITY PROFILER

[75] Inventors: Peter T. Shaw, Warrington; Arthur P. Stevens, Jenkintown; Anthony Marino, Doylestown, all of Pa.

[73] Assignee: The United States of America as represented by the Secretary of the Navy, Washington, D.C.

[21] Appl. No.: 631,588

[22] Filed: Dec. 21, 1990

[51] Int. Cl.$^5$ .............................................. G01S 15/00
[52] U.S. Cl. ......................................... 367/91; 367/90
[58] Field of Search ..................................... 367/91, 90

[56] References Cited

U.S. PATENT DOCUMENTS 4,270,191  5/1981  Prynaud ................................ 367/91

Primary Examiner—Daniel T. Pihulic
Attorney, Agent, or Firm—James V. Tura; James B. Bechtel; Susan E. Verona

[57] ABSTRACT

The velocity of a vessel is determined in real time by a doppler sonar system providing acoustic beams wherein received beams provide a plurality of bins or returns from various depth segments. The frequency shift with respect to at least two different bins is determined. The velocity of the vessel with respect to each bin is determined according to the phase shift of the respective bin. The vessel velocity is determined as an average of the determined velocities of the bins along the acoustic beam. The acoustic beams are paired to form beam pairs wherein each bin in one beam of the beam pair has a corresponding bin in the other beam of the beam pair. The phase shifts of the corresponding bins are used to determine a relative frequency shift for the corresponding bins. This determination is made along the length of the beams of the beam pair and averaged. The averaged resolved ship doppler profiler velocity when compared to inertial velocities determines water current velocities. When the bin averaged doppler velocities are compared to a sliding average of the water current velocities accurate reference velocities are output in real time for inertial navigation system velocity damping. In addition the real time depth change of a ship can be measured by integrating the summed vertical velocity.

22 Claims, 6 Drawing Sheets

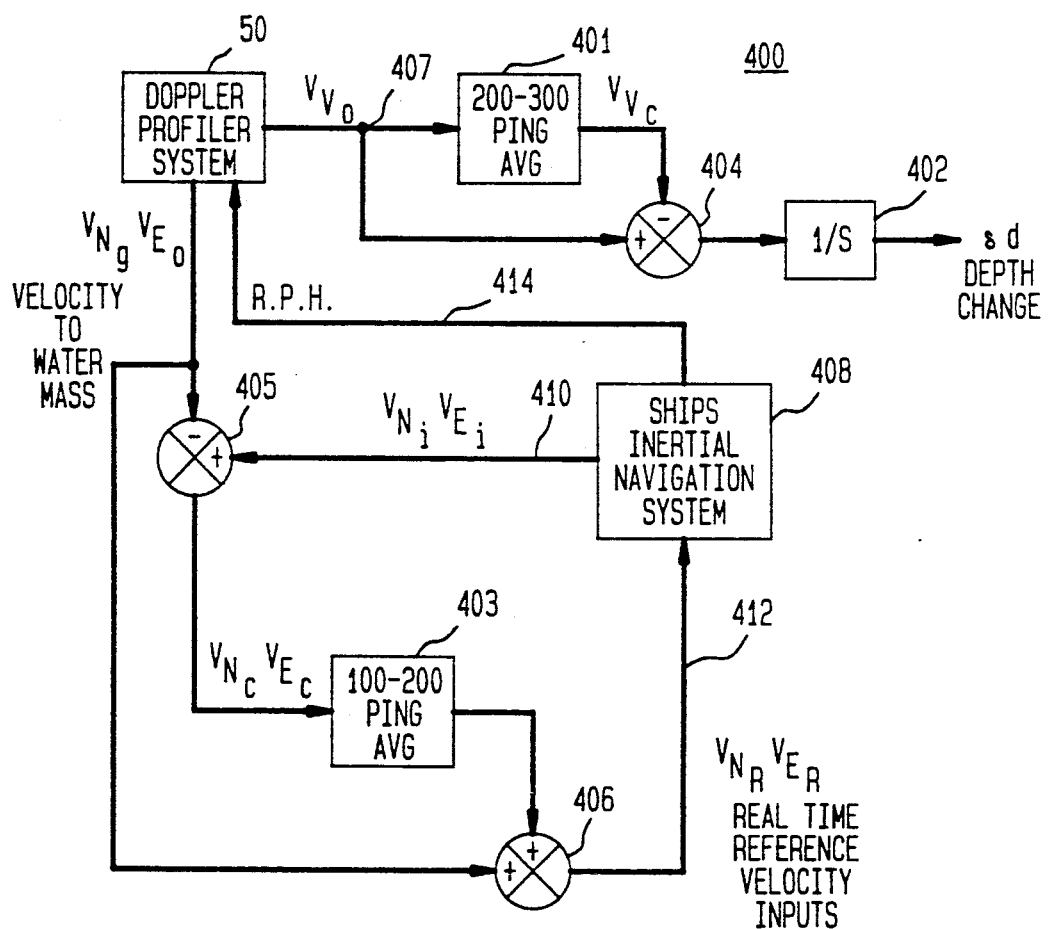

DOPPLER VELOCITY PROFILER

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

1. Field of the Invention

This invention relates to Doppler velocity measurements and in particular to the use of a Doppler velocity profiler for the determination of the velocity of a ship and for velocity damping an inertial navigation system.

2. Background Art Statement

The Doppler sonar velocity log makes a relative velocity measurement using the Doppler shift effect at a single depth. This information is then sent to the inertial navigation system of the ship for use in the reduction of stability errors which are produced by changes in the motion of the ship.

Attempts to apply Doppler velocity log corrections in real time were unsuccessful. The problem with a single ping doppler velocity measurement in real time that is based on a single relatively small water column slice or bin is that it is subject to noise spikes which can cause erroneous velocities to be measured. Prior art systems depended on time averaging these single bin doppler velocity measurements to filter out these noise spikes. However, when performing the measurements this way, prior art systems filtered out true ship velocity changes because the long term averaging, on the order of ten to twenty seconds, smooths out interim changes.

In addition, the single bin measurements of Doppler velocity taken close to the hull of a ship produced system errors due to the ship effects such as bubble sweep-down, turbulent boundary layer and hull displacement effects on the water column bin. Additionally, errors related to ocean surface disturbances due to wind such as sea state influences were produced. The single bin of the prior art systems was typically fifteen meters or less below keel. The analog phase locked loop method of calculation used by the Doppler sonar velocity log was firmware controlled. The doppler produced reference velocity errors in the navigation damping loop of the Ships Inertial Navigation System (SINS) due to these factors were uncompensated.

Other state of the art systems employing correlation sonar and electromagnetic logs input velocity errors due to these same factors into the navigation systems which are also uncompensated.

SUMMARY OF THE INVENTION

The velocity of a vessel is determined in real time by a sonar system providing acoustic beams wherein each beam is provided with a plurality of bins. The frequency shift with respect to at least two different bins is determined. The velocity of the vessel with respect to each bin is determined according to the phase shift of the respective bin. The vessel velocity is determined as an average of the determined velocities of the bins along the acoustic beam for a transmitted sonar ping.

The vessels real time velocity with respect to the ocean water mass bins is determined as an average or a median of the determined velocities of the bins along the acoustic beam for a transmitted sonar ping. The ocean water mass bins have circulation current, tidal, inertial and thermal velocity components. These components are inherently long term components which typically have a breadth of one mile or more. They are stable in that they have negligible velocity differences point to point at any given depth. The water mass current velocities are determined by subtracting the ships inertial velocity outputs of the navigation system from resolved doppler profiler water mass vertically averaged velocities.

For normal ship velocities the last two to three minute sliding average of the water mass current velocity components provides a stable though moving water mass velocity reference bench mark free of noise spikes. From this real time reference velocity values for SINS damping can be determined by summing the water mass sliding average currents with the ship doppler profiler vertical average velocities referenced to the water mass.

In addition, doppler profiler vertical averaged velocities normal to the deck plane once resolved can be sliding for two to three minutes to nominally determine the water mass bin average vertical velocity. When this is added to the real time inputs of vertical profiler resolved velocities and integrated the output is the change in displacement or depth in the water determined in real time. The depth change inputs can be used to correct bathymeteric depth measurements of other ships sensors in real time.

BRIEF DESCRIPTION OF THE DRAWINGS

FIG. 6 shows a block diagram representation of a system for determining real time velocity of a vessel which can be used to provide improved reference velocity damping to the inertial navigation system and depth measurement of a ship.

DETAILED DESCRIPTION OF INVENTION

Figure 1:
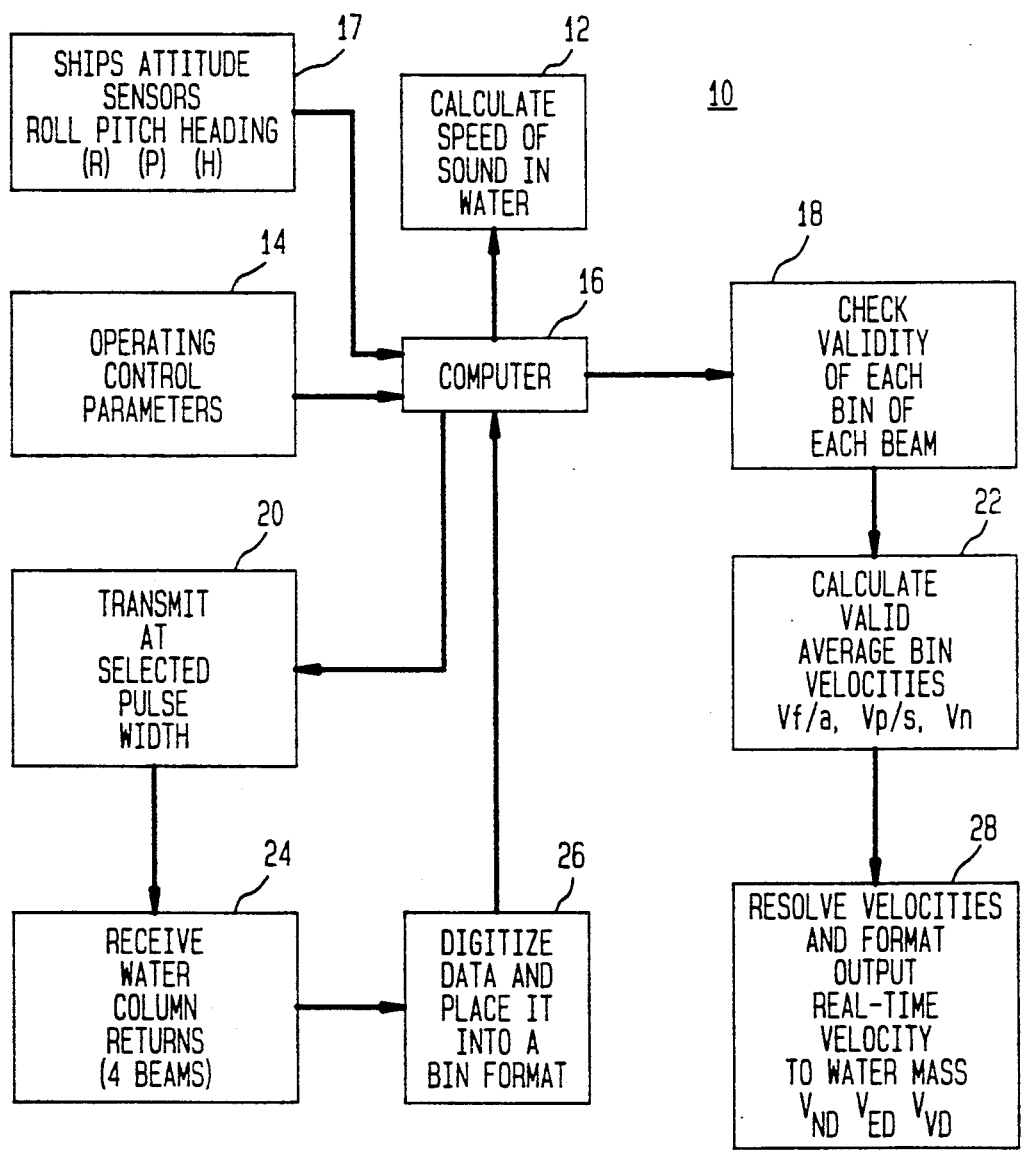
FIG. 1 shows an abstract functional block diagram representation of the Doppler sonar velocity profiler of the present invention.

Referring now to FIG. 1, there is shown an abstract functional block diagram representation of Doppler sonar velocity profiler method 10 of the present invention. Doppler sonar velocity profiler method 10 determines the velocity of a ship by measuring the shift in frequency of a sonar signal off scatters in ocean water mass. The measured shift in the sonar signal frequency is proportional to the relative velocity of the ship with respect to the ocean water mass below the ship and is easily converted into values representative of the ship's local geographic coordinate system velocities, $V_N$, $V_E$, and $V_V$. However, to obtain stability in these measurements of signal frequency shift it is necessary to overcome random scattering effects and electronic noise spikes which are always present in the measurement environment.

Doppler velocity profiler method 10 is effective for making continuous real time relative velocity measurements using the Doppler shift effect from scaterer acoustic signal returns of a large quantity of relatively thick water column slices or bins over an extensive preselected depth range in a water column that is relatively stable. This allows for vertical averaging and the attenuation or editing out of random noise spikes which may cause erroneous velocity measurements. The velocity measurements of velocity profiler method 10 may then be transmitted to the inertial navigation system of the ship where they may be used to reduce stability errors which are produced by changes in the motion of the ship.

Thus in Doppler sonar velocity profiler system 10 of the present invention, computer 16 determines the velocity of sound in water as shown in block 12. The desired operating or control parameters, bin size, and depth range are set in block 14 and, in the single ping embodiment, acoustic beams are transmitted by velocity profiler system 10 at a selected pulse width as shown in block 20. In block 24 the selected water column returns are received and the received data is digitized and placed into a bin format by velocity profiler method 10 as shown in block 26. Computer 16 then determines the validity of the data of each bin for each of the four acoustic beams as shown in block 18. After valid bin data is established for all four acoustic beams by computer 16 in block 18, and the single ping depth average velocities of all the valid bins are calculated in block 22. These velocities are averaged over the entire depth range of a beam. This velocity data is resolved into earth coordinates using ships attitude sensor input 17 then formatted and output in real time as a data string by velocity profiler method 10 as shown in block 28.

Figure 2:
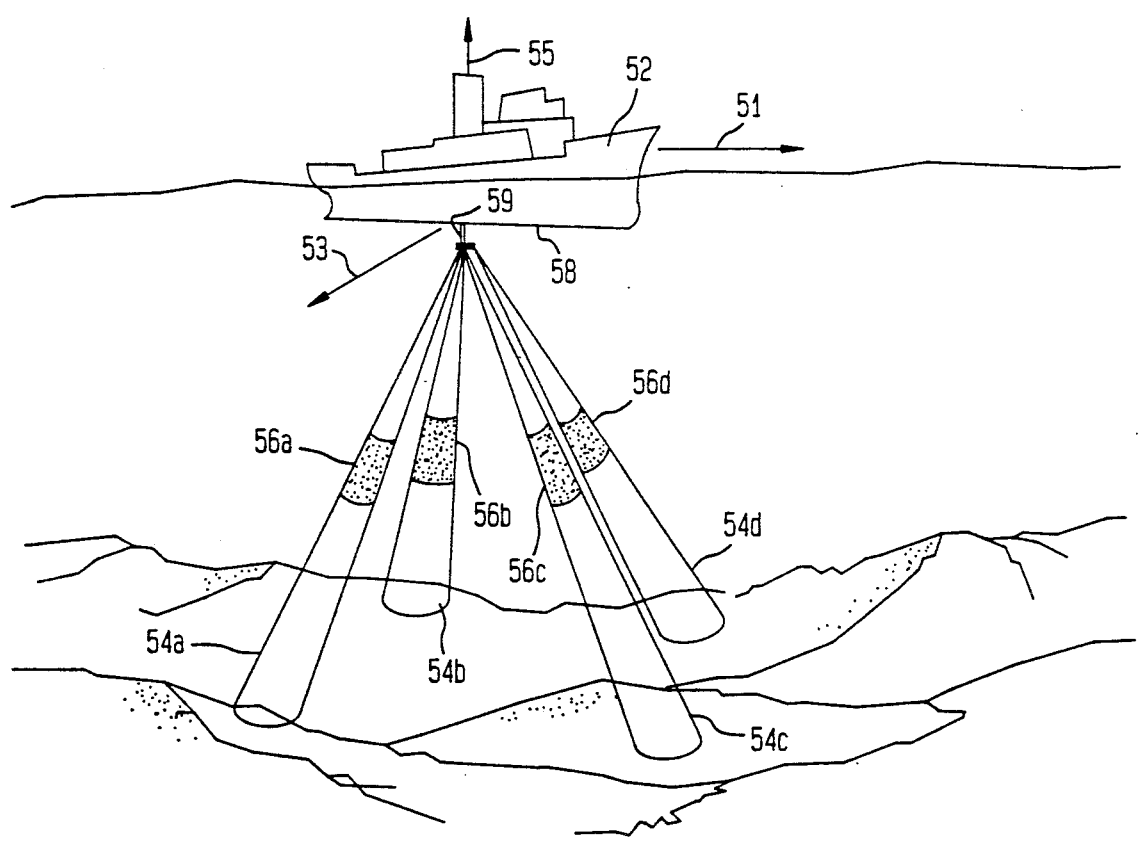
FIG. 2 shows a Doppler velocity profiler system using the Doppler velocity profiler method of FIG. 1.

Referring now to FIG. 2, there is shown Doppler velocity profiler system 50 using Doppler velocity profiler method 10 of the present invention to determine velocity vector 51, velocity vector 53 and velocity vector 55 of ship 52. Doppler velocity profiler system 50 is applied in a deep ocean environment or in an environment wherein the ocean bottom is more proximate. In Doppler velocity profiler system 50 four acoustic beams 54a-d are transmitted from a conventional transducer 59 of four elements mounted on ship 52. In the preferred embodiment, conventional transducer 59 may be mounted on hull 58 of ship 52.

The four acoustic beams 54a-d, transmitted by transducer 59, are: starboard acoustic beam 54a, aft acoustic beam 54b, forward-acoustic beam 54c, and port acoustic beam 54d. Any conventional Doppler sonar frequency may be used within Doppler sonar velocity profiler system 50. The optimum frequency depends on the speed of ship 52 and the hull effect on the water mass below ship 52. In general, higher frequencies provide better resolution while lower frequencies provide sonar return with a greater range of bins and consequently more stable layers. Acoustic beams 54a-d are considered in pairs: the forward acoustic beam 54c and and aft acoustic beam 54b form one pair; the starboard acoustic beam 54a and port acoustic beam 54d form the other pair. It will be understood by those skilled in the art that the method of the present invention may be practiced using three, four, twenty or any other number of acoustic beams 54.

Material in the ocean, such as plankton, and other organisms as well as microscopic debris, scatter acoustic beams 54a-d back toward hull 58 of ship 52 from multiple selected water column bin depths where the scattered echoes of acoustic beams 54a-d are sensed by the elements of transducer 59. Thus Doppler sonar velocity profiler system 50 determines in real time the velocity of ship 52 using data representative of conditions in the water mass which is a substantial distance from hull 58 of ship 52.

In order for Doppler profiler system 50 to accomplish this, timing and measuring of frequency shifts over a large number of respective beam portions 56a-d of the depth range of each acoustic beam 54a-d are performed. There may be, for example, twenty or more bins 56a-d along the length of an acoustic beam 54a-d. These measurements are performed at each bin 56a-d or beam portion 56a-d along the length of each respective acoustic beam 54a-d. The measurements of the beam portions 56a-d along a respective acoustic beam 54a-d are averaged. Thus, for example, twenty measurements may be averaged for a beam 54a-d.

Beam portions 56a-d may be selected far enough away from ship 52 to avoid producing errors due to unstable water mass. For example, ocean mass thirty, forty, or one-hundred or more meters deep may be used to assure stable water mass. This selection, or time slicing, may be accomplished using timing gates. Additionally, averaging and editing out of extraneous data over the respective depth ranges is performed. Using the timing and frequency information, the approximately instantaneous relative velocity components of ship 52 in these directions are determined in real time by profiler method 10 within Doppler velocity profiler system 50. This velocity information is represented by fore and aft velocity vector 51 along the longitudinal axis of ship 52, athwart ship velocity vector 53 perpendicular to fore and aft velocity vector 53 and vertical velocity vector 55 normal to the deck plane.

Figure 3:
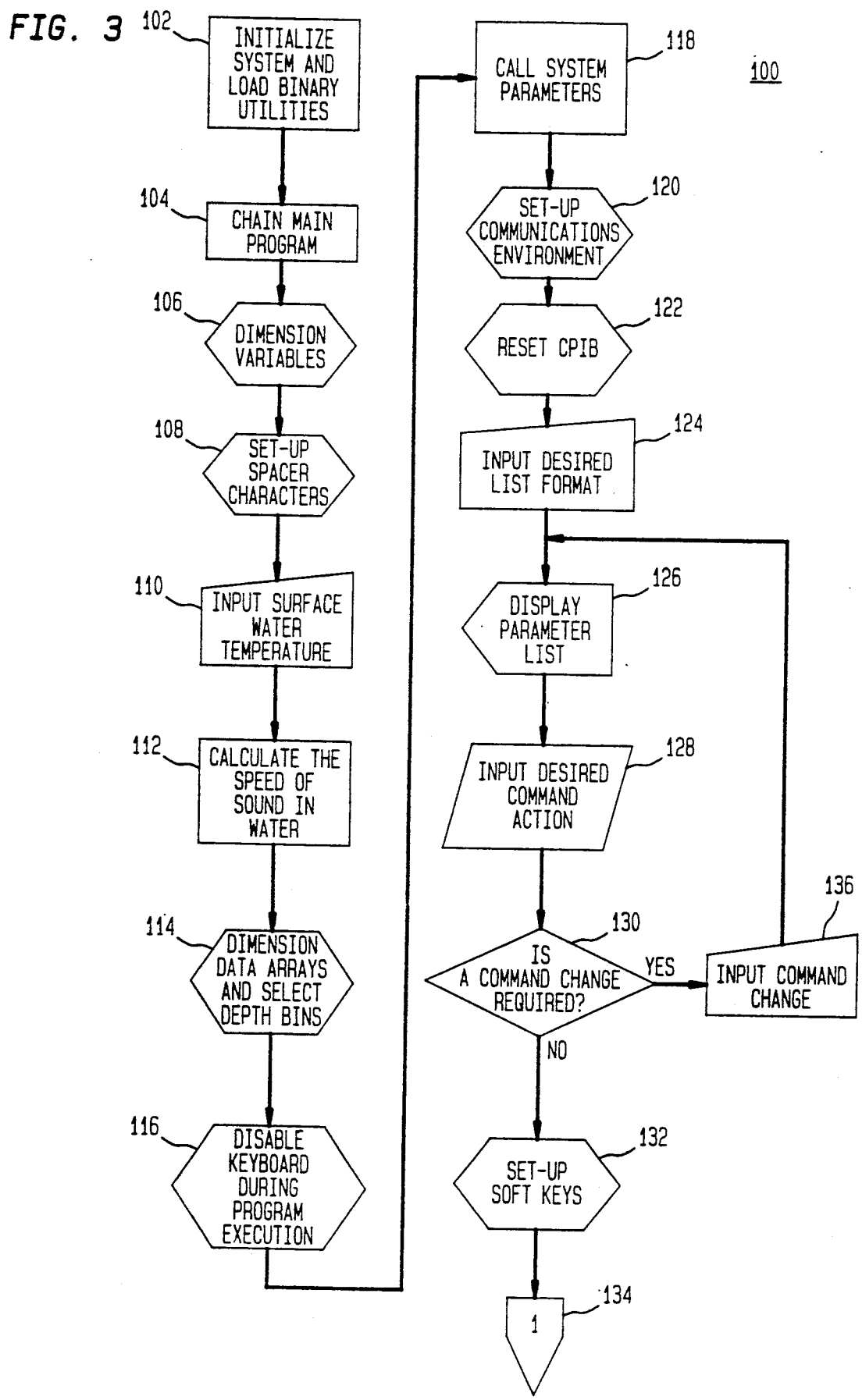
FIG. 3 shows a block diagram representation of a velocity profiler algorithm for use within the Doppler velocity profiler method of FIG. 1.

Referring now to FIG. 3, there is shown velocity profiler algorithm 100. Velocity profiler algorithm 100 is a more detailed algorithm for performing a portion of the functions of Doppler velocity profiler method 10. Within Doppler velocity profiler method 10, information with respect to the frequency shifts over beam bins 56a-d of acoustic beams 54a-d are processed to develop instantaneous depth average bin velocities both along and across the track of ship 52 using velocity profiler algorithm 100.

In initiation block 102 of velocity profiler algorithm 100 a conventional initialization routine loads binary utilities from mass storage and performs the initialization functions of profiler method 10. After the initialization functions have been performed, the main operating program is loaded from mass storage as shown in block 104. The main operating program loaded in block 104 dimensions the variables of the program as shown in block 106 and sets the fixed value string characters required for interfacing within Doppler sonar velocity profiler system 50 as shown in block 108.

A valid water surface water temperature in the vicinity of transducer 59 is required by profiler algorithm 100 of Doppler velocity profiler method 10 in order to calculate an accurate value of the speed of sound in water for use in the velocity calculation. Thus, profiler algorithm 100 receives the surface water temperature at input 110. The speed of sound in water is calculated from Wilson's equation in block 12 using the surface water temperature value received at input 110, the speed of sound in water is calculated in block 112 as previously described.

The bin size and depth range which are to be used in calculating velocity vectors 51, 53 of ship 52 are selected by velocity profiler algorithm 100 in block 114 to optimize the probability of obtaining valid velocities for each ping or transmitted acoustic pulse of profiler system 50. Keyboard input is disabled in block 116 and command parameters are set in block 118. The command parameters of Doppler sonar velocity profiler method 10, as set in block 118 of algorithm 100, include the transmit pulse width of acoustic beams 54a-d and used by Doppler sonar velocity profiler system 50, the size and number of depth bins, gain settings and other parameters which set up the acoustic environment for the operation of Doppler sonar velocity profiler system 50. These parameters are operator selectable and vary with the presence of ocean scaterers and the size, draft and speed characteristics of the ship 52 on which Doppler velocity profiler method 10 is used. The loaded parameter list is displayed at block 126 to allow for any required changes of parameters before operation begins.

The desired command actions are input at block 128 of profiler algorithm 100 and a determination is made at decision 130 whether a command change is required. If a command change is required, as determined in decision 130, the command change is received at input 136 and execution of profiler algorithm 100 returns to block 126 to display the amended parameter list. If a command change is not required, as determined in decision 130, soft keys are set up in block 132. Once the required parameters are set and verified, execution of velocity profiler algorithm 100 of method 10 enters the operating mode. Execution then proceeds from velocity profiler algorithm 100 by way of off-page connector 134.

Figure 4:
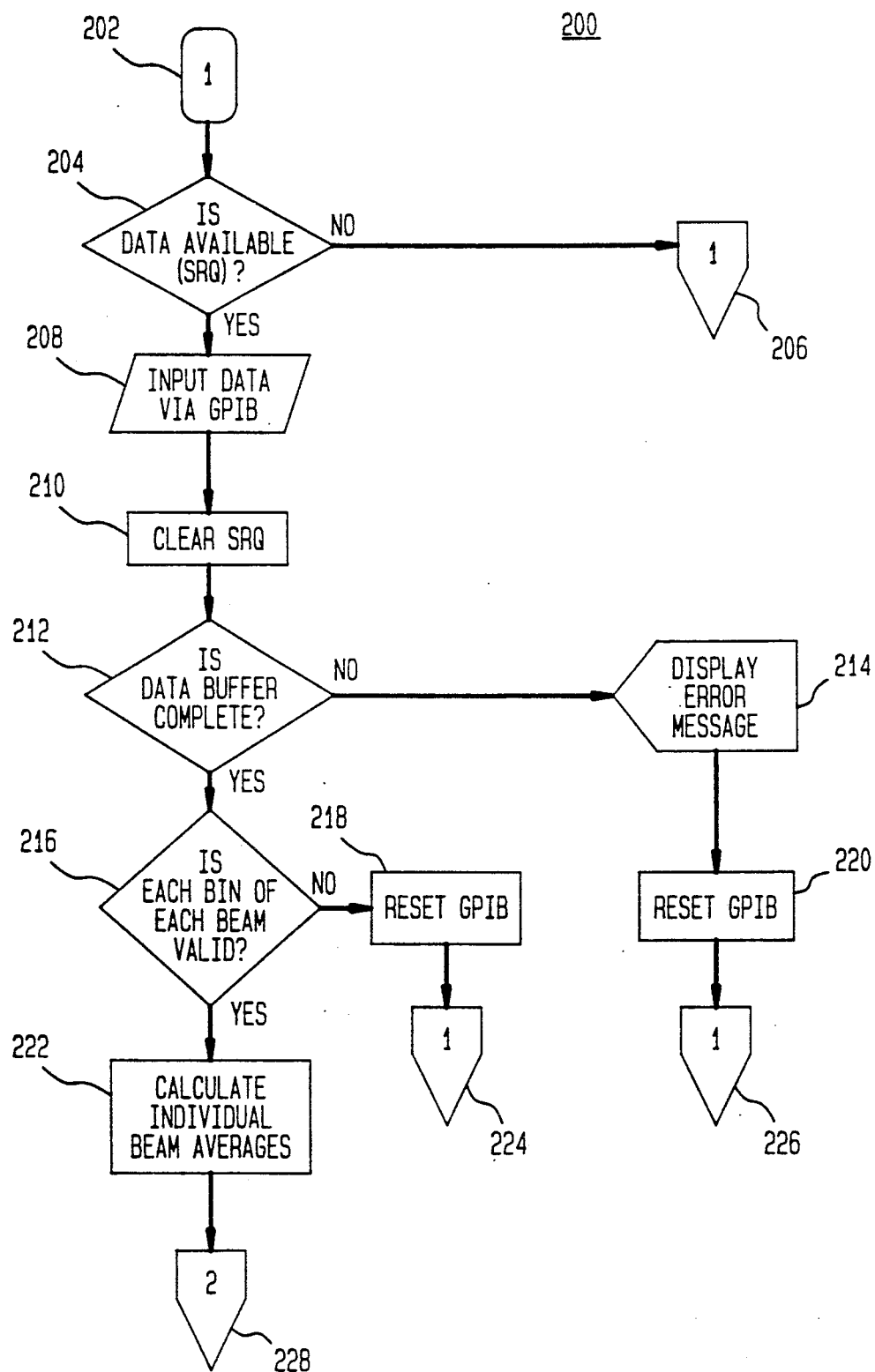
FIG. 4 shows a block diagram representation of a velocity profiler algorithm for use within the Doppler velocity profiler method of FIG. 1.

Referring now to FIG. 4, there is shown velocity profiler algorithm 200. Velocity profiler algorithm 200 is more detailed algorithm for performing a portion of the functions of Doppler velocity profiler method 10. Execution of velocity profiler algorithm 200 begins at on-page connector 202. Execution may arrive at on-page connector 202 by way of off-page connector 134 of profiler algorithm 100. Using off-page connector 206 and on-page connector 202, velocity profiler algorithm 200 continuously checks for data by detecting a service request interrupt as shown in decision 204 until one is located. When a service request interrupt is detected at decision 204, data is input from the main electronics unit via a conventional general purpose interface bus (GPIB) as shown at block 208. The service request interrupt is then cleared as shown in block 210.

Once the data is input in block 210 by velocity profiler algorithm 200 of Doppler velocity profiler method 10, a determination is made whether the input buffer string is complete in decision 212. If the input buffer data stream is not complete, a new string must be input. Therefore, when the input buffer string is not complete, execution of profiler algorithm 200 proceeds to block 214 where an error message is displayed. The GPIB is reset in block 220 and execution of profiler algorithm 200 proceeds by way of off-page connector 226 to on-page connector 202 to again make a determination at decision 204 whether there is data available by detecting a service request interrupt.

When a full data string is received, as determined at decision 212, a determination is made whether the received data is valid. If the signal-to-noise ratio of any transmitted acoustic beam 54a-d of any bin does not meet the preselected acceptance threshold, the corresponding value in the count array is set to zero and the data is not used. When this occurs, as determined at decision 216, GPIB is reset at block 218 and execution of velocity profiler algorithm 200 proceeds by way of off-page connector 224 to on-page connector 202 to detect another service request interrupt.

If the data in each bin of each acoustic beam 54a-d is valid, as determined at decision 216, the individual beam averages for all bins are calculated by velocity profiler algorithm 200 at block 222. For velocity profiler algorithm 200 to calculate these individual velocity averages of beam pairs, execution proceeds by way of off-page connector 226. Acoustic beams 54a,d form one beam pair and acoustic beams 54b,c form another beam pair.

Figure 5:
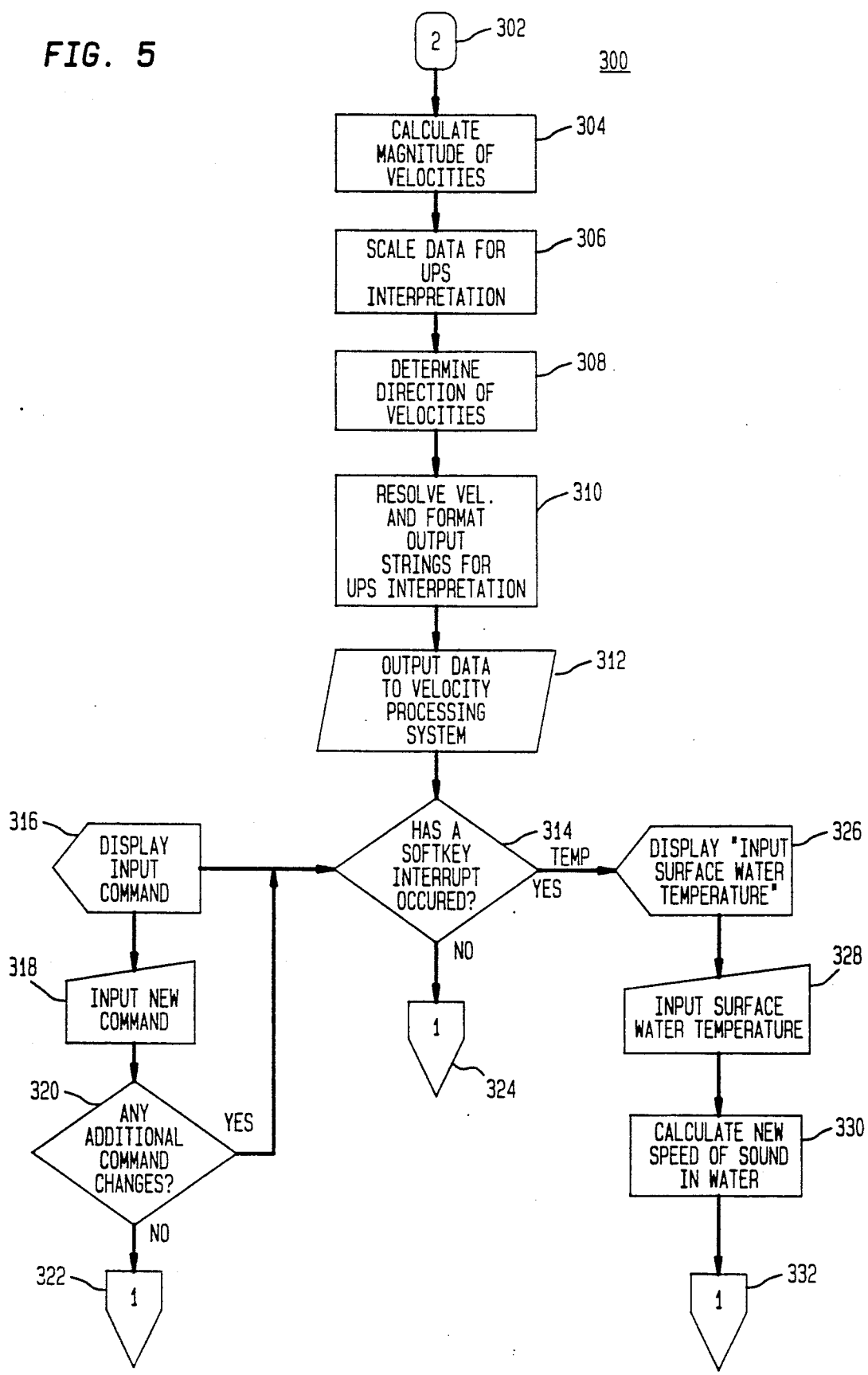
FIG. 5 shows a block diagram representation of a velocity profiler algorithm for use within the Doppler velocity profiler method of FIG. 1.

Referring now to FIG. 5, there is shown velocity profiler algorithm 300. Velocity profiler algorithm 300 is a more detailed algorithm for performing a portion of the functions of Doppler sonar velocity profiler method 10. Execution of velocity profiler algorithm 300 begins at on-page connector 302. Execution proceeds to on-page connector 302 by way of off-page connector 228 of velocity profiler algorithm 200 when a determination is made within velocity profiler algorithm 200 of Doppler velocity profiler method 10 that the input data of each bin within the selected depth ranges of each acoustic beam 54a-d is valid and that the individual bin velocity averages for the beam pairs of acoustic beams 54a-d may therefore be validly calculated.

After the data validity has been thus verified and an averaged bin velocity value for each acoustic beam 54a-d is calculated by profiler algorithm 200 in block 22, depth averaged velocity vector 51 along the track ($V_{f/a}$) of ship 52, the depth averaged velocity vector 53 across the track ($V_{p/s}$) of ship 52, and the depth averaged velocity vector 55 normal to the deck plane ($V_n$) of ship 52 can be calculated by velocity profiler algorithm 300 using the following algorithms:

$$V_n = (V_{forebeam} + V_{aftbeam} + V_{starboardbeam} + V_{portbeam}) * C/4*(f)* \cos(E)$$

$$V_{f/a} = (V_{forebeam} - V_{aftbeam}) * C/2*(f)* \sin(E)$$

$$V_{p/s} = (V_{starboardbeam} - V_{portbeam}) * C/2*(f)* \sin(E)$$

Where:
$V_{f/a}$ = velocity fore-aft along the track of ship 52,
$V_{p/s}$ = velocity port-starboard across track of ship 52,
$V_{forebeam}$ = velocity component of fore beam 54c,
$V_{aftbeam}$ = velocity component of aft beam, 54b,
$V_{starboardbeam}$ = velocity component of starboard beam 54a,
$V_{portbeam}$ = velocity component of port beam 54d,
C = speed of sound in water,
f is the Doppler sonar velocity profiler system 50 operating frequency.
E degrees is the nominal looking angle (elevation angle) of each acoustic beam 54a-d to the normal of ship 52.

The magnitude and direction of velocity vectors 51, 53 and 55 of ship 52 are thus determined by velocity profiler algorithms 100, 200, 300 of Doppler sonar velocity profiler method 10 of the present invention. The data determined by Doppler sonar velocity profiler method 10 is then resolved and formatted as set forth in block 310 and output to the velocity processing computer system 400 of ship 52 in block 312. In velocity processing system 400 of ship 52 the data is compared to inertial velocities to determine current, averaged in time and by a feed back loop provides real time reference velocity for damping. In the damping velocity processing system (not shown) of ship 52 the data is interpreted, weighted, and along with other velocity sensor inputs is used to correct velocity errors in the inertial navigation system 408 of ship 52 which are caused by motion of ship 52. Any time during operation of Doppler sonar velocity profiler system 50, when a parameter change is required, or when a change in water temperature occurs, corrections can be made by utilizing a soft key method as shown in decision 130 and blocks 128, 136 of velocity profiler algorithm 200.

Thus Doppler sonar velocity profiler system 50 can calculate ships vertical, fore-aft and athwart-ship velocities for an entire water column. This water column is comprised of four acoustic beams 54a-d of data, each of which is separated into contiguous bins whose size and number are software selectable. This allows selection of only the depths which historically have good clean data available. The best depths are typically depths which are below the sea state and ship hull effects and above depths where the return signal-to-noise ratios are too low. The data collected from this controlled water column can then be used to calculate valid, instantaneous, real time, depth averaged velocities vertically and along and across the track of ship 52. In addition, before the selected water column is used to calculate velocity vectors 51, 53, and 55 of ship 52, each bin 56a-d of each acoustic beam 54a-d is checked to see if it has a reasonable signal-to-noise ratio or an erroneous velocity, for example caused by a fish. Points which deviate more than a selectable amount from the median velocity are eliminated.

The doppler velocity process utilizes real time velocity differences to determine reference water mass inertial velocity such that when averaged over a number of pings, it provides a stable reference benchmark for providing real time earth coordinate velocity signals to the SINS velocity computer for damping purposes.

Referring now to FIG. 6, velocity processing computer system 400 is shown. Therefore, doppler velocity processing computer system 400, including inertial navigation system 408 provides roll, pitch and heading inputs to doppler profiler system 50 by way of line 414 for resolving doppler profiler 50 ship coordinate velocities $V_{f/a}$, $V_{p/s}$ $V_n$ into earth coordinates $V_{ND}$, $V_{ED}$ and $V_{VD}$ velocities. Velocities processing computer 400 includes doppler profiler system 50 for providing the earth coordinates of doppler vertical average velocity $V_n$ to integrator 402 by way of sliding time averager 401 and node 404 to provide the change in depth displacement of ship 52.

Additionally, doppler profiler system 50 applies signals to nodes 405, 406. The doppler profiler system 50 vertically averaged velocities $V_{f/a}$, $V_{p/s}$ once resolved are output in earth coordinates, compared to SINS inertial velocities to determine water mass currents, and sliding time averaged for the last two to three minutes or one hundred to two hundred pings to provide a stable bench mark reference current velocity of the water mass. When this is compared to the real time input, real time reference velocity for damping SINS is provided.

In addition when inertial navigation system inertial vertical velocities are available for input they may be applied at juncture point 407 as a summing node point similar in fashion to node 405. The output of the summing node are input to a sliding averager and the output is subtracted from the real time profiler vertical velocity and the output signal is integrated, ship depth change measurements are provided. It will be understood by those skilled in the art that the signal applied by the way of line 410 from SINS 408 is representative of the inertial velocities of SINS.

Thus doppler velocity processing computer 400 provides a system for determining the real time reference velocity of vessel 52 which is used to provide improved velocity damping to the ships inertial navigation system in order to reduce navigation errors from ship velocity disturbances in particular during maneuvers. The output of the summing nodes 404 is input to an integrator 402 to provide the change in depth displacement of ship 52. Additionally, doppler profiler 50 applies earth coordinate north and east doppler velocities to summing nodes 405, 406.

Using input from SINS 408 applied to node 405 by way of line 410, node 405 provides signals representative of water mass currents in earth coordinates $V_{NC}$ and $V_{EC}$ to sliding averager 403. The signal output of sliding averager 403 representative of the last one hundred to two hundred ping time averaged water mass currents is applied to node 406 along with the signals of doppler profiler system 50 to provide true real time reference velocity feedback to SINS 408 by way of line 412.

Doppler profiler 50 provides the earth coordinate vertical velocity ($V_{VD}$) to sliding averager 401 and summing node 404. Sliding averager 401 provides a sliding average of vertical velocity doppler profiler 50 outputs last one hundred to two hundred doppler pings to summing node 404. For surface ships the time output average of the running averager 401 is the vertical current of the water mass returns of the doppler profiler 50 because the nominal vertical ship displacement averages to zero over a period of time.

Many modifications and variations of the present invention are possible in view of the above disclosure. It is therefore to be understood, that within the scope of the appended claims, the invention may be practiced otherwise than as specifically described.

We claim:

1. A method for determining the velocity of a vessel in real time in a sonar system having means for providing a plurality of acoustic beams each having a plurality of bins, comprising the steps of:
   (a) determining a bin frequency shift with respect to each of at least two different bins of a selected acoustic beam; and,
   (b) determining an average velocity in accordance with said at least two determined bin frequency shifts of step (a).

2. The method for determining the velocity of claim 1, wherein step (b) comprises the steps of:
   (c) determining corresponding bin velocities in accordance with said determined bin frequency shifts; and,
   (d) averaging the determined bin velocities of step (c) to determine said velocity.

3. The method for determining the velocity of claim 1, comprising the further steps of:
   (e) pairing two acoustic beams of said plurality of acoustic beams to form an acoustic beam pair;
   (f) selecting a first bin of a first acoustic beam of said beam pair; and,
   (g) selecting a corresponding second bin of a second acoustic beam of said acoustic beam pair.

4. The method for determining the velocity of claim 3, wherein step (a) comprises the further step of determining a first relative frequency shift in accordance with the frequency shift of said first bin and the frequency shift of said corresponding second bin.

5. The method for determining the velocity of claim 4, wherein step (b) comprises further steps of:
   (h) determining a second relative frequency shift in accordance with a third bin of said first acoustic beam and a corresponding fourth bin of said second acoustic beam;
   (i) determining a third relative frequency shift in accordance with a fifth bin of said first acoustic beam and a corresponding sixth bin of said second acoustic beam;
   (j) determining said average vessel velocity in accordance with said second and third relative frequency shifts.

6. The method for determining the velocity of claim 1, wherein step (b) comprises determining the fore and aft velocity.

7. The method for determining the velocity of claim 1, wherein step (b) comprises determining the vertical velocity.

8. The method for determining the velocity of claim 1, wherein step (b) comprises the step of determining the athwart ship velocity.

9. The method for determining the velocity of claim 1, wherein step (a) is followed by the further step of determining whether data representative of said bin frequency shift is valid.

10. The method for determining the velocity of claim 9, wherein the step of determining whether said data is valid comprises determining in accordance with the signal-to-noise ratio of an acoustic beam.

11. The method for determining the velocity of claim 9, wherein step (b) comprises determining said velocity in accordance with said bin frequency shift only if said data is valid.

12. The method for determining the velocity of claim 1, wherein step (b) comprises determining said velocity in accordance with a plurality of determined bin frequency shifts along the entire length of said selected beam.

13. The method for determining the velocity of claim 1, comprising the further step of determining water temperature.

14. The method for determining the velocity of claim 1, comprising the further step of selecting a bin disposed below unstable water mass.

15. The method for determining the velocity of claim 3, wherein steps (f) and (g) comprise selecting said first and second bins of first and second acoustic beams by means of a timing gate having a predetermined time delay.

16. The method for determining the velocity of claim 15, wherein said first and second selected bins are selected in accordance with respective timing gates having predetermined time delays which are substantially equal.

17. The method for determining the velocity of claim 5, wherein step (j) further comprises determining a median velocity.

18. The method for determining the velocity of claim 9, wherein there is provided a median velocity and step (b) comprises determining said velocity in accordance with said bin frequency shift only if said data differs from said median velocity by less than a predetermined amount.

19. The method for determining the velocity of claim 2, wherein the velocity determined in step (b) is a median velocity.

20. The method for determining the velocity of claim 1, comprising the further steps of:
   (i) determining earth coordinates;
   (j) determining water mass currents in accordance with said earth coordinates;
   (k) determining a sliding average of water mass current velocities; and,
   (l) adjusting said average velocity in accordance with said water mass sliding average currents.

21. The method for determining the velocity of claim 20, comprising the further step of applying real time reference velocities in earth coordinates to the vessels inertial navigation system.

22. The method for determining the velocity of claim 20, wherein step (l) comprises further steps of
   (m) summing a plurality of averages and the water mass sliding vertical velocity average; and
   (n) integrating the resultant output to determine the real time change in depth of said vessel.

* * * * *